US008653953B2

(12) United States Patent
Biondo et al.

(10) Patent No.: US 8,653,953 B2

(45) Date of Patent: Feb. 18, 2014

(54) ODOMETER VERIFICATION AND REPORTING USING A TELEMATICS-EQUIPPED VEHICLE

(75) Inventors: William A. Biondo, Beverly Hills, MI (US); George Baker, Troy, MI (US); David T. Proefke, Madison Heights, MI (US); Kevin E. Fondaw, Rochester Hills, MI (US); Catherine L. McCormick, New Boston, MI (US)

(73) Assignees: General Motors LLC, Detroit, MI (US); GM Global Technology Operations LLC, Detroit, MI (US)

( * ) Notice: Subject to any disclaimer, the term of this patent is extended or adjusted under 35 U.S.C. 154(b) by 117 days.

(21) Appl. No.: 13/084,852

(22) Filed: Apr. 12, 2011

(65) Prior Publication Data

US 2012/0262283 A1 Oct. 18, 2012

(51) Int. Cl.

*B60Q 1/00* (2006.01)
*B60R 25/10* (2013.01)
*G01M 17/00* (2006.01)

(52) U.S. Cl.

USPC ..................... 340/425.5; 340/426.1; 340/438; 701/29.1

(58) Field of Classification Search

None

See application file for complete search history.

(56) References Cited

U.S. PATENT DOCUMENTS

| | | | | |
|---|---|---|---|---|
| 6,750,823 | B2 | 6/2004 | Turnbull et al. | |
| 2002/0133271 | A1* | 9/2002 | McDermott et al. | 701/1 |
| 2002/0186144 | A1* | 12/2002 | Meunier | 340/825.28 |
| 2004/0064247 | A1* | 4/2004 | Davis | 701/201 |
| 2004/0093146 | A1 | 5/2004 | Gustavsson et al. | |
| 2006/0017549 | A1* | 1/2006 | Nguyen | 340/425.5 |
| 2006/0229780 | A1* | 10/2006 | Underdahl et al. | 701/35 |
| 2009/0118899 | A1* | 5/2009 | Carlson | 701/35 |
| 2010/0185357 | A1* | 7/2010 | Mizumachi | 701/33 |

FOREIGN PATENT DOCUMENTS

| | | |
|---|---|---|
| WO | WO 00/49680 | 8/2000 |

* cited by examiner

*Primary Examiner* — George Bugg
*Assistant Examiner* — Munear Akki
(74) *Attorney, Agent, or Firm* — Anthony L. Simon; Reising Ethington P.C.

(57) ABSTRACT

A system and method for providing an odometer verification for a vehicle. The method carried out by the system includes the steps of: (a) receiving authorization from a customer to periodically store odometer information obtained from the customer's vehicle; (b) configuring at least one processing device such that it automatically stores odometer readings and associated correlation parameter values for the vehicle; (c) receiving a request for an odometer verification; (d) analyzing the odometer readings and associated correlation parameter values in response to the request; (e) determining a verification result based on the analysis; and (f) sending the verification result to a recipient in response to the determination.

20 Claims, 3 Drawing Sheets

ODOMETER VERIFICATION AND REPORTING USING A TELEMATICS-EQUIPPED VEHICLE

TECHNICAL FIELD

The present invention relates to vehicles having telematics units and to vehicle telematics services that are carried out using the telematics units.

BACKGROUND OF THE INVENTION

Many jurisdictions have enacted laws requiring specific disclosures of odometer information by a seller of a vehicle. For example, the seller may have to certify under signature that the odometer reading displayed by the vehicle is correct, that it is not correct, or that it has exceeded its mechanical limits (which typically applies to older non-electronic types of odometers). Odometer fraud has been a known problem wherein a seller "rolls back" or otherwise alters the displayed mileage in an attempt to make a potential purchaser believe that the vehicle is worth more money than it actually is. Detection of odometer fraud has not been easily accomplished, thereby necessitating the practice of self-regulation by having the seller certify the odometer reading at the time of sale.

More modern vehicles sometimes have electronic odometers that provide mileage information that can be obtained via a communication bus within the vehicle. Sometimes, these vehicles are also equipped with a telematics unit that permits the mileage information to be obtained by the telematics unit and sent back to a call center for use in providing various types of telematics services. See, for example, US Patent Application Publication No. 2007/0173992 entitled Vehicle Email Notification System and Method.

SUMMARY OF THE INVENTION

According to one embodiment of the invention, there is provided a method of providing an odometer verification result for a vehicle. The method includes the steps of: (a) periodically receiving an odometer reading for a vehicle indicative of the total mileage traveled by the vehicle; (b) storing the odometer readings after they are received; (c) receiving a request for an odometer verification; (d) verifying a current odometer reading in response to the request using the previously-stored odometer readings; and (e) providing an odometer verification notification in response to the verification in step (d).

In accordance with another embodiment of the invention, there is provided another method of providing an odometer verification result for a vehicle. The method includes the steps of: (a) periodically receiving an odometer reading for a vehicle indicative of the total mileage traveled by the vehicle; (b) storing the odometer readings after they are received; (c) determining a negative mileage accumulation based on at least two of the stored odometer readings; (d) determining the vehicle's location; and (e) sending from the vehicle a notification indicating the negative mileage accumulation along with the vehicle location. Steps (a)-(e) can be carried out automatically by the vehicle such that no user intervention is needed to monitor and report on the odometer readings.

In accordance with yet another embodiment of the invention, there is provided a method of providing an odometer verification result for a vehicle. The method includes the steps of: (a) receiving authorization from a customer to periodically store odometer information obtained from the customer's vehicle; (b) configuring at least one processing device such that it automatically stores odometer readings and associated correlation parameter values for the vehicle; (c) receiving a request for an odometer verification; (d) analyzing the odometer readings and associated correlation parameter values in response to the request; (e) determining a verification result based on the analysis; and (f) sending the verification result to a recipient in response to the determination.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The system and methods described below are directed to providing an odometer verification service that can be used at one or more times during the service life of a vehicle to provide an electronically-based objective determination of whether a current odometer reading is an accurate indication of the actual cumulative miles traveled by the vehicle. This service can be used, for example, when the vehicle is being sold to a second or third owner to help substantiate the accuracy of the on-board odometer reading, and this objective confirmation of the vehicle mileage may help increase resale or residual value of the vehicle. It could also be used for warranty coverage verification by dealerships to help ensure that warranty coverage is not provided to a vehicle that is actually out of warranty due to excessive mileage where the odometer reading has been "rolled back" or otherwise altered.

Communications System—

Figure 1:
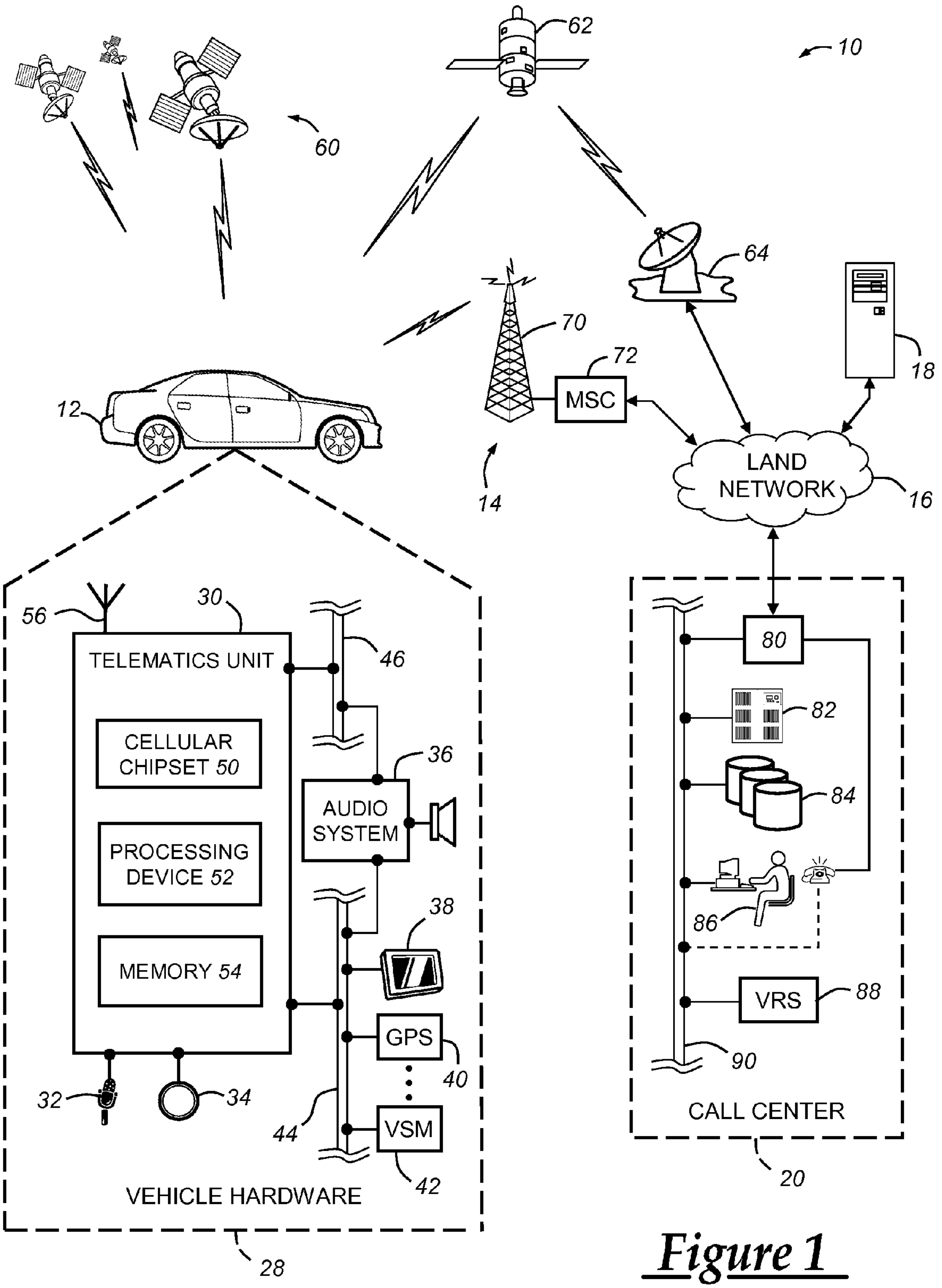
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
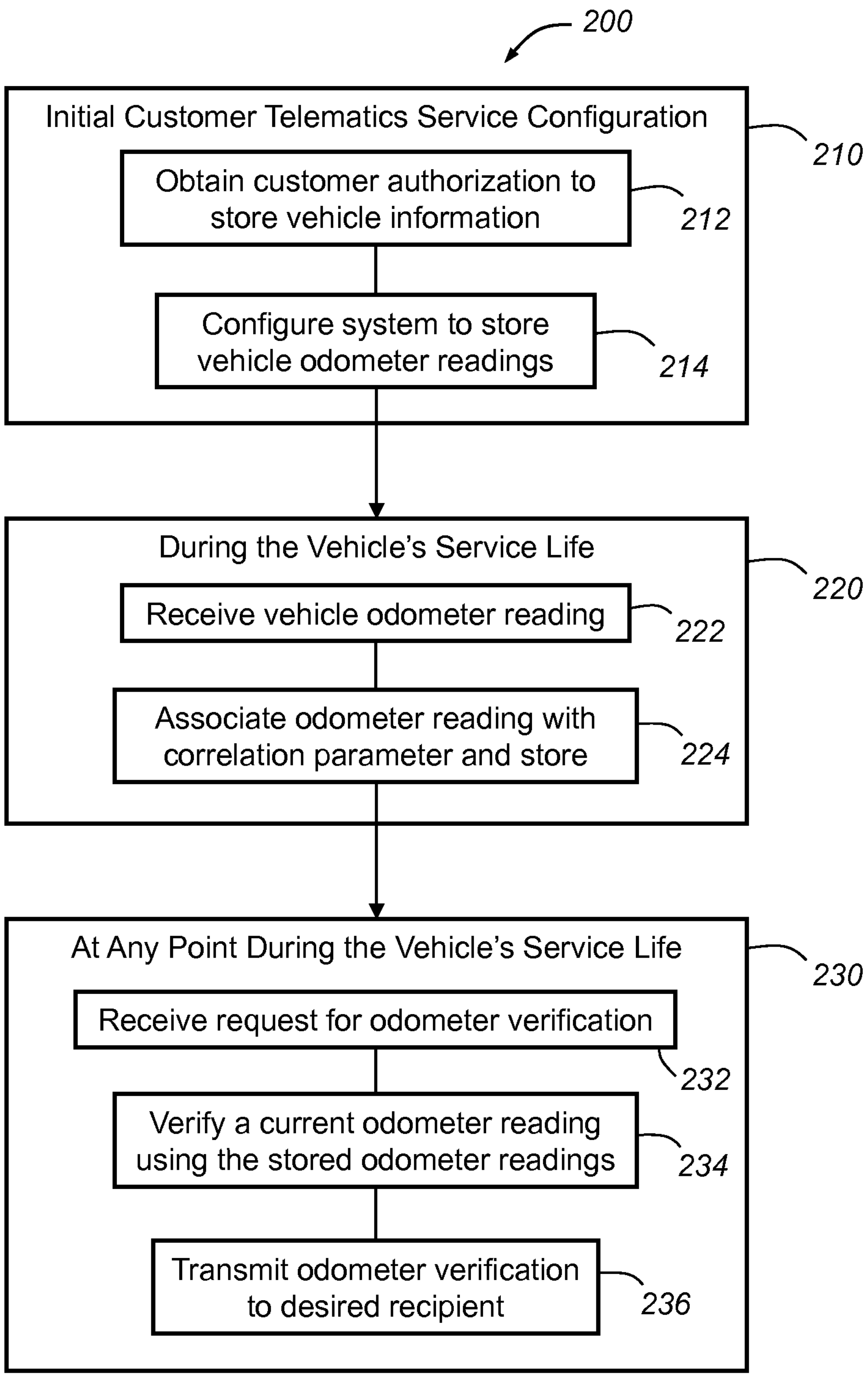
FIG. 2 is a flowchart depicting a method of odometer verification that can be carried out by the communications system of FIG. 1.

Turning now to FIG. 2, there is shown a method 200 of providing an odometer verification for a vehicle that can be implemented using the system of FIG. 1. It will be appreciated that this method 200 can be carried out using suitable programming of the various FIG. 1 hardware devices, for example by programming of the telematics unit 30 and call center components (e.g., server 82 and database 84), and those skilled in the art will be aware of appropriate programming languages and software design approaches to be used in carrying out these methods. In general, the method involves periodically receiving and storing odometer readings for the vehicle and then, upon subsequently receiving a request for an odometer verification, using the stored odometer readings to determine whether a current odometer reading is correct and, if so, thereafter providing an odometer verification notice to the requestor or other designated recipient.

The method 200 begins at block 210 wherein an initial configuration can be carried out based on customer authorization. For example, at or following delivery of a vehicle to a customer, an initial telematics service configuration may be carried out in which an account is established for the customer in the call center 20 and the telematics unit is configured to enable various services desired by the customer. In general, the implementation of such initial telematics service configuration setups are known to those skilled in the art and, as used in the method 200, such an initial configuration can be modified to permit the customer to activate the odometer verification process of FIG. 2. In some embodiments, this can be carried out by providing the customer with an option to enroll in the odometer verification service carried out by method 200, including obtaining permission from the customer to store the vehicle information that will be used in the verification process. In other embodiments, a more general authorization to store vehicle information can be obtained without specifically identifying the odometer verification service, and the option of having the odometer verified can later be presented to the customer, such as at a later time when they wish to sell the vehicle. However implemented, in the method 200 the customer's authorization to store vehicle information in general, or odometer readings in particular, is obtained at step 212. The actual receipt of the customer's authorization can either be verbal (e.g., during a voice call between the customer and call center 20 via the telematics unit 30 to establish service), written (e.g., received in writing from the customer by the dealership when the vehicle is delivered), or electronic (e.g., received at call center 20 via a website accessed by the customer over the Internet from a personal computer to sign into their account and establish and authorize various telematics services).

Once customer authorization is obtained, the system at step 214 automatically configures at least one processing device such that it automatically stores the odometer readings and associated correlation parameter values for the vehicle, as will be discussed below. In some embodiments, this processing device can be the telematics unit 30 with its processor 52 and memory 54, such as for embodiments where the method 200 is carried out either substantially or entirely by the vehicle 12. In some other embodiments, this processing device can be a remotely located processing device such as the server/database at call center 20, and this can be used, for example, in embodiments where most or all of the steps of method 200 are carried out at the call center. And in yet other embodiments, processing devices at both the vehicle 12 and call center 20 are configured as a part of carrying out method 200. The actual configuration of the telematics unit 30, call center 20, or both will depend on how the odometer verification service is to be implemented. For example, in some embodiments, the telematics unit may be configured to send odometer readings to the call center at substantially regular intervals (e.g., once a month or semi-annually) for the specific purpose of their use in the odometer verification process. In that case, the telematics unit can be programmed with a monthly or semi-annual trigger that, when the trigger occurs, causes the telematics unit to obtain the odometer reading via the vehicle communication bus 44 (using procedures known to those skilled in the art), and send the odometer reading to the call center via the wireless communication system 14. In another embodiment, no special additional programming of the telematics unit 30 may be needed for the method 200, as the telematics unit 30 may already be configured to carry out various telematics services for the customer that involve periodically sending odometer readings; for example, where the telematics unit 30 is configured to periodically send vehicle diagnostic information to the call center for reporting onto the customer. An example of this is described in US Patent Application Publication No. 2007/0173992, the entire contents of which are hereby incorporated by reference. In this case, the call center can be configured to store and use the odometer readings obtained in carrying out these other telematics services and then use that stored information if and when needed to carry out the odometer verification process. Other such implementations will become apparent to those skilled in the art.

Once the system is initially configured, the process moves to step 220 where it operates during the vehicle's use in service to periodically receive odometer readings and store them in conjunction with one or more correlation parameters. Thus, at step 222, the odometer readings are periodically received either at the telematics unit 30 to be stored locally at the vehicle or by the call center 20 to be stored remotely. When received at the call center, the odometer readings can be received via communication from the telematics unit 30 or in some other manner, such as from a reading taken while the vehicle is being serviced at the dealership. In the context of obtaining odometer readings, "periodically" means that the information is obtained at different times, which may be at fixed time intervals or intermittently. As noted above, in some embodiments, the mileage information is periodically received at the call center as a part of carrying out various other telematics services, and not specifically for the purpose of obtaining odometer readings to verify their accuracy. By recording the odometer information each time some other telematics service is carried out that involves the odometer reading being sent, the system can take advantage of the fact that the call center is already periodically provided with mileage information, and can use that mileage information to track changes in odometer readings over time. This permits accumulation of the data needed for odometer verification possibly without adding any extra required telematics communications between the vehicle and call center over those already used for other telematics services.

As a hybrid approach, the system could store odometer readings as they are received during the course of providing other telematics services, with the call center or telematics unit also being configured to specifically obtain and record an odometer reading if, for example, too much time has passed since the last one was received. In this way, the system takes advantage of using odometer readings that are received in the course of providing other telematics services, yet will monitor how often the readings are received and take action to obtain an updated mileage reading if one is needed. This could be useful, for example, where odometer readings are fairly regularly received in connection with other telematics services, such as monthly diagnostic reporting, but for which that service later expires or is otherwise discontinued and subsequent odometer readings are not received regularly or at all. Also, not all odometer readings received at the telematics unit or call center need be recorded. The system could, for example, be configured to only record odometer readings on somewhat regular intervals, for example, monthly, quarterly, or semi-annually, so that, if during the course of providing telematics services, the system records one odometer reading and then receives another several days later as a part of some other telematics service being carried out, the system could determine that this subsequent reading is too soon and not needed for odometer verification and, accordingly, could decide not to store it.

However configured, once the odometer reading is received, it is then associated and stored in connection with one or more correlation parameters that will be used in the verification analysis to determine whether or not the mileage reading is correct. One exemplary correlation parameter is date information indicating when the odometer reading was taken. The date can be supplied with the odometer reading, e.g., as a date recorded by the telematics unit 30 when the odometer reading was taken and then sent to the call center 20 with the odometer reading. Alternatively, the date can be obtained by the call center itself when the odometer reading is received on the basis that it will be sufficiently contemporaneous with the odometer reading so as to fairly represent when that reading was taken. As another option, rather than recording a date, the mileage readings could be stored in received order either by being enumerated or by being stored at memory locations or in such a way that the order in which they were received can later be determined. This ordering of the stored odometer readings also constitutes a correlation parameter—one that provides a temporally-ordered sequence (e.g., a chronology) of mileage readings which may then be used for the purpose of odometer verification in the later steps of method 200.

Instead of or in addition to recording date information or otherwise preserving the chronology of the recorded odometer readings, the system can use other types of correlation parameters; that is, it can associate non-temporal information with the recorded readings, such as total vehicle runtime or any other suitable information that can be used to determine whether the odometer reading is likely correct or whether it has been tampered with. For example, both odometer and engine runtime can be recorded at the same time and then later used to in the odometer verification analysis. Examples of these other correlation parameters include vehicle (e.g., engine) runtime, number of ignition events (e.g., a cumulative count of how many times the vehicle is started), number of transmission shifts from a parked position, driver door openings, average vehicle speed, or any other detectable vehicle parameter that (either individually or in combination with other information) correlates at least generally with mileage.

Thus, each odometer reading can be stored in conjunction with a value for one or more associated correlation parameters. And, as indicated above, the correlation parameter values can be, for example, a date or other timestamp associated with the odometer reading, a number or memory location indicative of the received order of the odometer reading, a cumulative vehicle runtime, a count of ignition events, a running average vehicle speed, etc. The correlation parameter values may then be used along with their associated odometer readings to determine whether or not an odometer verification can be given. The analysis used by the illustrated embodiment to make that determine is described below.

Independently of the periodic recording of odometer readings at step 220, the system may at any point during the service life of the vehicle (or at least during the customer's telematics service subscription period) receive a request for an odometer verification. This and the method for processing the request is shown generally at step 230. The request is received at step 232 and can be received from the customer or other authorized requestor either at the call center 20 or vehicle 12 itself. The request can be initiated, for example, via a press of pushbutton 34 at the vehicle and/or by voice request at the vehicle, or can be done via a voice or data call to the vehicle or call center, or via a request sent from the requestor's computer or mobile phone to the vehicle or call center.

In response to the request, the system at step 234 uses the stored odometer readings in an attempt to verify the correctness of a current odometer reading (e.g., either the current reading from the vehicle, or perhaps the most recently-received odometer reading). In general, the verification carried out at step 234 involves analysis of the odometer readings and their associated correlation parameter values to determine if a current reading appears correct. In some embodiments, this can be done by comparing readings based on their correlation parameter values (recorded date, recording order, engine runtime, etc.) to confirm that the odometer reading shows a continuously-increasing mileage (e.g., when arranged chronologically, the mileage readings show a continual increase in miles driven). Since the odometer readings are received serially (sequentially) over time, then in some embodiments the current odometer reading can be verified by determining that, when ordered chronologically, each successive odometer reading is greater than its preceding odometer reading. In some implementations this may be deemed sufficient to verify the odometer reading as correct.

Apart from determining that the odometer readings are temporally increasing (i.e., no negative mileage accumulations), a deeper analysis may be carried out if desired. That is, rather than verifying that the mileage is continually increasing, a more robust analysis can be conducted to look for expected correlations between odometer readings and other parameters. For example, where mileage and associated vehicle runtime (e.g., engine hours) are both recorded, data concerning average or normal correlations of mileage and vehicle runtime can be used to determine whether the engine runtimes recorded for vehicle 12 properly correlate to the associated recorded mileages. For example, if at odometer reading 45,231 the engine runtime was 3,770 hours, but then at a subsequent odometer of 48,660 the engine runtime was 7,226 hours, the system might decide that the odometer reading cannot be verified as likely correct because between those two readings the number of engine hours approximately doubled (a 92% increase) while the reported mileage only increased by about 7-8%. That inconsistency between two parameters that normally correlate might suggest that the odometer reading has been tampered with or has otherwise become an unreliable indicator of actual miles driven. To determine the degree of correlation required to satisfy the verification testing, data can be aggregated from many vehicles and averaged or otherwise statistically analyzed to determine expected norms. Then, during the analysis of step 234, the system can compare the data for a particular vehicle with these averages or other norms and, if the vehicle does not meet these criteria, then the system may decide to fail the verification.

In other embodiments, some of the correlation parameters can be used together. For example, the two approaches described in the preceding two paragraphs can be used together. Thus, for example, verification of the current odometer reading can be awarded only if (1) each recorded odometer reading is determined to be greater than the preceding odometer reading AND (2) the odometer readings correlate with some other vehicle correlation parameter, such as engine runtime. This two-part analysis can be used to provide a more accurate determination of whether the current odometer reading can be verified.

In some embodiments, correlation parameters can be analyzed together to determine if verification is appropriate. For example, the process can use two or more parameters together to determine an expected mileage that can then be compared to the current odometer reading. For example, where the vehicle's average speed is determined, this can be used in conjunction with the engine runtime to determine an expected number of miles driven which can then be compared to the odometer reading to determine whether it appears correct. Other such approaches to odometer verification will become apparent to those skilled in the art.

At step 236, an odometer verification result is sent. Where the current odometer reading has been verified, the odometer verification result transmitted by the system can be an odometer verification notification that is sent to a recipient in response to the verification to inform him or her that that the verification was successful. Similarly, if the odometer cannot be verified as correct, than the verification result can be a verification failed notification sent to the recipient. These notifications can take any suitable form, such as an email, textual or graphic display at the vehicle or on the computer from where the request for verification was sent. Thus, for example, where a request for odometer verification is made via a computer a vehicle dealership, the verification can be carried out at the vehicle, call center, or other location as discussed above, and the verification or failure notification can be sent back to the dealership computer. Or, this could be done by the customer from their home or office computer, resulting in an email or displayed web page back to the customer that can then be forwarded or printed out. As noted above, the request for odometer verification can be made at the vehicle (e.g., via a vehicle user interface) or remotely, for example, via a web portal that provides the request to the call center, or via an email, SMS or other electronic message from the customer. Similarly, the odometer verification result can be provided at the vehicle itself or at a web portal or transmitted via email, SMS or other electronic message. For example, in one embodiment, the odometer readings are received at the call center and stored there, with a odometer verification request being made at the call center (e.g., via a web portal), and the verification determination and reporting can also be done at the call center. Thus, a dealer either purchasing or selling a vehicle could use this process to verify the odometer. Such information could also be transmitted to a governmental agency, such as in the event of a title transfer to electronically provide a reported mileage and confirmation that it is correct. In another embodiment, the entire process could be carried out at the vehicle, so that the odometer readings are stored on the vehicle, the verification request is made at the vehicle by an occupant, and the analysis and results reporting can also be done at the vehicle. This could be useful to show a potential purchaser who is examining the vehicle that it's odometer is accurate.

In some embodiments, the processing at step 220 can involve obtaining and storing odometer readings without any substantial processing or analysis of the obtained data. In other embodiments, the obtained odometer data can be analyzed continuously or periodically (e.g., at regular or irregular intervals) and reported as needed. For example, the odometer readings can be analyzed at the vehicle or call center as they are received to determine whether there has been any negative accumulation of mileage (i.e., whether the odometer reading shows a lower total mileage than the most recent prior reading) and, if so, appropriate action taken. An example of this shown in FIG. 3 which is an odometer monitoring method that may be carried out automatically (without any user intervention or involvement) as a part of implementing step 220 of FIG. 2. The process can involve continuously or periodically monitoring the odometer reading, beginning at step 321 where an odometer reading is obtained; for example, by telematics unit 30 over communication bus 44. Then, at step 322 a check is made to determine if there has been any negative accumulation of mileage. This can be done in any suitable manner; for example, by comparing the odometer reading obtained in step 321 with the most recent prior odometer reading obtained during a prior iteration of method 320. Thus, successive odometer readings can be taken and stored, as discussed above in connection with FIG. 2, and one or more of these prior readings can be compared with a current odometer reading to determine whether the current reading is lower than one or more of the prior readings. If so, this indicates an inadvertent or intentional (e.g., mechanical or electronic "rollback") of the odometer which can be used to decide that the odometer cannot be verified and ultimately, that a verification failed notification should be sent.

Figure 3:
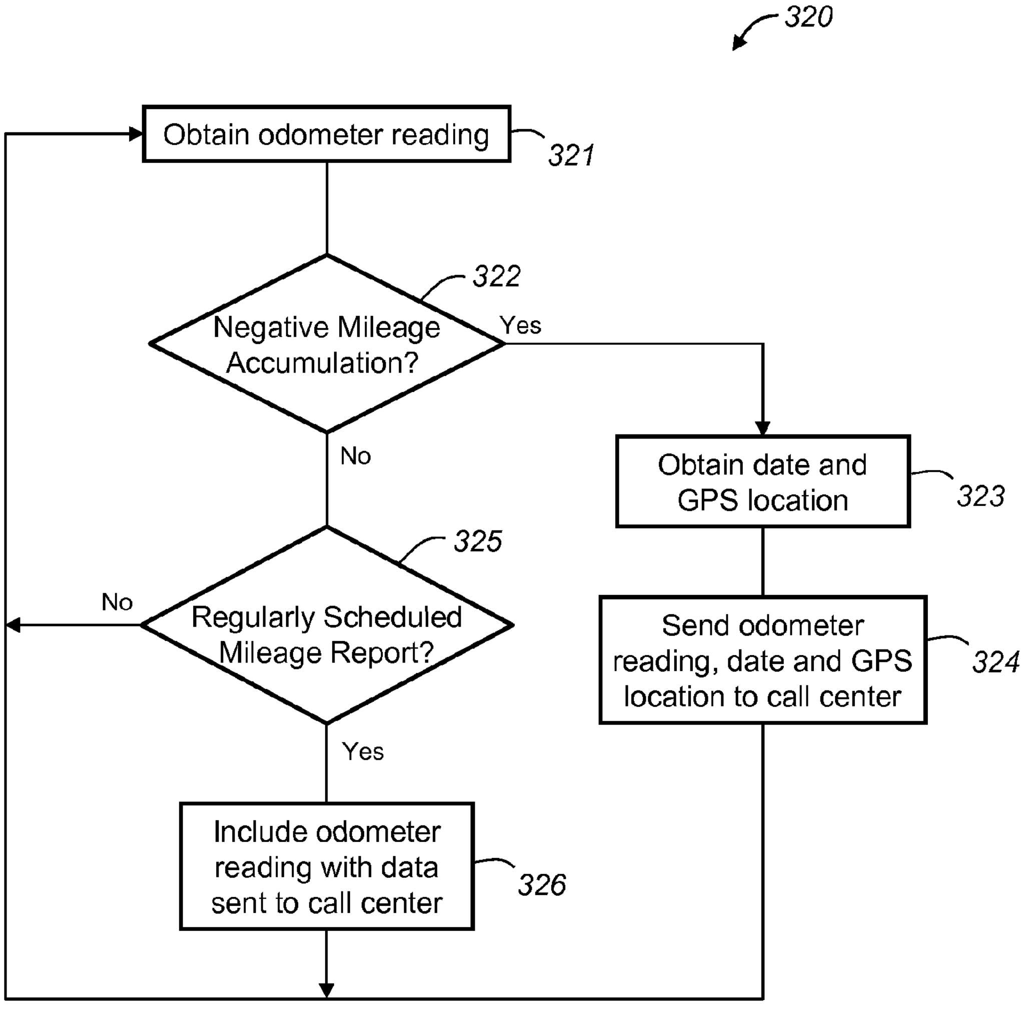
FIG. 3 is a flowchart depicting a method that can be used with the odometer verification method of FIG. 2 to monitor and report odometer readings.

Thus, at step 322 where a negative mileage accumulation is found, the process moves to step 323 where the telematics unit or other module within the vehicle obtains a timestamp and vehicle location. The timestamp can be simply the date, or can contain date and time at any desired resolution (e.g., to the hour, minute, second, parts of a second). The vehicle location can be obtained in any suitable manner, such as using GPS module 40 to obtain GPS coordinates of the vehicle. Other methods of determining vehicle location will be known to those skilled in the art. Then, at step 324, a notification is sent from the vehicle indicating the negative mileage accumulation along with the date (timestamp) and vehicle location. The notification can include the odometer reading as indicated in FIG. 3, and can include other information, such as the prior odometer reading that is in excess of the current one. In some embodiments, only some of this information is sent with the notification, such as the vehicle location. The notification received at the call center can then be used to send a verification failed notification to the customer or other recipient, and that notification can include the vehicle location. In other embodiments, the notification from the vehicle need not be sent to the call center as indicated in step 324, but can be sent, for example, as a verification failed notification that is sent directly to the customer or other recipient, or sent (presented) to an occupant of the vehicle over a vehicle user interface such as the audio system 36. The process can then loop back to step 321 to continue monitoring the odometer readings, or can terminate or perform other actions.

Normally at step 322 the current odometer reading will be in excess of the prior reading(s) and so there will not be any determination of a negative mileage accumulation. Thus, the process will then move to step 325 where a check is made to determine if it is time for a regularly scheduled mileage report. This can be, for example, a monthly diagnostic report that is sent back to the call center to provide the customer with a vehicle condition report for such things as oil life, tire pressure, engine status, mileage, account status, etc. If there is no regularly scheduled mileage reporting due, then the process can loop back to step 321 to continue monitoring the odometer readings, or can terminate or perform other actions. If it is time to report out the mileage, then the process moves to step 326 where the current odometer reading is bundled with other data sent to the call center for storage and/or use in providing a customer report, or for other purposes. Thereafter, the process can loop back to step 321 to continue monitoring the odometer readings, or can terminate or perform other actions. Although shown together in method 320, the checks made at steps 322 and 325, if used at all, can be independent processes that run simultaneously or at different times.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the periodic recordings of the odometer readings can be used in some embodiments to build a mileage history that can later be used for the verification analysis and/or to provide the vehicle owner or telematics subscriber with a mileage history (history log) of the vehicle. This history log can be integrated in with a maintenance service records for the vehicle and can be electronically transmitted to the customer or other recipient upon request. In other embodiments, the odometer readings can still be periodically obtained and recorded, but a complete history of the recorded mileage readings need not be maintained. For example, each time a new odometer reading is received that is to be recorded, it can be compared to the most recently recorded reading to ensure that it shows that the reported vehicle mileage has increased. Once this has been verified, the (older) most recently recorded reading can be replaced by the new reading in memory, such that the stored odometer readings are used for the verification analysis, yet only one odometer reading is stored at any one time. All such other embodiments, changes, and modifications are intended to come within the scope of the appended claims.

As used in this specification and claims, the terms “for example,” “for instance,” “such as,” and “like,” and the verbs “comprising,” “having,” “including,” and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing an odometer verification result for a vehicle, comprising the steps of:

(a) periodically receiving an odometer reading for a vehicle indicative of the total mileage traveled by the vehicle;

(b) storing the odometer readings indicative of the total mileage traveled by the vehicle after they are received;

(c) receiving a request form a call center for an odometer verification;

(d) determining a negative mileage accumulation based on at least two of the stored odometer readings;

(e) based on the determination in step (d), determining the vehicle’s location; and (f) sending to an extra-vehicle recipient a notification indicating the negative mileage accumulation along with the vehicle location.

2. The method of claim 1, wherein step (a) further comprises receiving at least some of the odometer readings of step (a) at a call center in conjunction with telematics services being provided via a wireless connection between the vehicle and call center.

3. The method of claim 1, wherein the mileage of the Current odometer reading is associated with a correlation parameter and wherein step (b) further comprises storing each odometer reading in association with a value for the correlation parameter, and wherein step d) further comprises prior to determining a negative mileage accumulation, verifying the current odometer reading by analysis of the odometer readings and their associated correlation parameter values.

4. The method of claim 3, wherein the correlation parameter values indicate the temporal order in which the odometer readings were received and wherein step d) further comprises prior to determining a negative mileage accumulation, verifying the current odometer reading at least in part by comparing the stored odometer readings based on their temporal order.

5. The method of claim 4, wherein the correlation parameter values comprise date information indicative of when their associated odometer reading was received.

6. The method of claim 3, wherein the correlation parameter values comprise vehicle runtime information indicative of the cumulative amount of time that the vehicle has been operated.

7. The method of claim 1, wherein either:

at least some of the steps (a)-(f) are carried out at the vehicle, or steps (a)-(f) are carried out at a call center using vehicle information that includes the odometer readings.

8. The method of claim 1, wherein step (b) further includes storing two or more correlation parameters associated with each odometer reading, and step (d) further includes prior to determining a negative mileage accumulation, verifying the current odometer reading using previously-stored odometer readings and their respective correlation parameters.

9. The method of claim 1, wherein step (a) further comprises receiving the odometer readings serially and wherein (d) further comprises prior to determining a negative mileage accumulation, verifying the current odometer reading if each successive odometer reading is greater than its preceding odometer reading.

10. The method of claim 1, wherein step (d) further comprises prior to determining a negative mileage accumulation, verifying the current odometer reading only if the stored odometer readings are determined to be temporally increasing and the stored odometer readings are determined to have a desired correlation with at least one other type of vehicle information.

11. The method of claim 1, wherein step (d) flintier comprises using at least two correlation parameters to determine an expected mileage and then comparing the expected mileage with the current odometer reading.

12. The method of claim 1, further comprising the step of creating a history log of odometer readings and wherein the method further comprises the step of electronically transmitting the history log to a recipient in response to a request.

13. A method of providing an odometer verification result for a vehicle, comprising the steps of:

(a) periodically receiving an odometer reading for a vehicle indicative of the total mileage traveled by the vehicle;

(b) storing the odometer readings after they are received;

(c) determining a negative mileage accumulation based on at least two of the stored odometer readings;

(d) based on the determination in step (c), determining the vehicle's location; and (e) sending to an extra-vehicle recipient a notification indicating the negative mileage accumulation along with the vehicle location;

wherein steps (a)-(e) are carried out automatically by the vehicle.

14. The method of claim 13, wherein at least steps (a), (b), and (c) are carried out at a call center.

15. A method of providing an odometer verification result for a vehicle, comprising the steps of:

(a) receiving authorization from a customer to periodically store current, total odometer mileage information obtained from the customer's vehicle;

(b) configuring at least one processing device for the vehicle such that it automatically stores current, total odometer readings and at least one associated correlation parameter value for each reading;

(c) receiving a request for an odometer verification;

(d) analyzing the odometer readings and associated correlation parameter values in response to the request;

(e) determining a negative mileage accumulation based on the at least one associated correlation parameter value for each reading;

(f) based on the determination in step (e), determining vehicle's location; and (g) sending to an extra-vehicle recipient a notification indicating the negative mileage accumulation along with the vehicle location.

16. The method of claim 15, wherein the correlation parameter values indicate the temporal order in which the odometer readings were stored and wherein step (d) further comprises comparing the stored odometer readings based on their temporal order.

17. The method of claim 16, wherein the correlation parameter values comprise date information indicative of when their associated odometer reading was received.

18. The method of claim 15, wherein the correlation parameter values comprise vehicle runtime information indicative of the cumulative amount of time that the vehicle has been operated.

19. The method of claim 15, wherein steps (a)-(g) are carried out at a call center using vehicle information that includes the odometer readings.

20. The method of claim 15, wherein step (d) further comprises using at least two correlation parameters to determine an expected mileage and then comparing the expected mileage with the current odometer reading.

* * * * *